(12) United States Patent
Takeuchi et al.

(10) Patent No.: US 8,263,261 B2
(45) Date of Patent: Sep. 11, 2012

(54) ACTIVE MATERIAL FOR NON-AQUEOUS ELECTROLYTE SECONDARY BATTERY, AND NON-AQUEOUS ELECTROLYTE SECONDARY BATTERY COMPRISING IT

(75) Inventors: Masanobu Takeuchi, Moriguchi (JP); Hiroyuki Fujimoto, Moriguchi (JP)

(73) Assignee: SANYO Electric Co., Ltd., Osaka (JP)

( * ) Notice: Subject to any disclaimer, the term of this patent is extended or adjusted under 35 U.S.C. 154(b) by 888 days.

(21) Appl. No.: 12/232,826

(22) Filed: Sep. 24, 2008

(65) Prior Publication Data
US 2009/0104533 A1    Apr. 23, 2009

(30) Foreign Application Priority Data

Sep. 25, 2007  (JP) ................................. 2007-247223
Mar. 14, 2008  (JP) ................................. 2008-065833

(51) Int. Cl.
*H01M 4/13*  (2010.01)
*H01M 4/88*  (2006.01)

(52) U.S. Cl. ................ 429/231.5; 429/218.1; 252/182.1

(58) Field of Classification Search ........................ None
See application file for complete search history.

(56) References Cited

U.S. PATENT DOCUMENTS 6,489,062 B1    12/2002  Watanabe et al. ........ 429/231.95
2007/0196735 A1  8/2007  Takeuchi et al. ........... 429/231.1

FOREIGN PATENT DOCUMENTS

| JP | 60-089067 | | 5/1985 |
| JP | 2000-243454 A | | 9/2000 |
| JP | 2002-063942 | * | 2/2002 |

OTHER PUBLICATIONS

Machine translation of JP 2002-063942, retrieved from <http://www.ipdl.inpit.go.jp/homepg_e.ipdl> on Oct. 6, 2011.*
Kassem, Phase relations in the Al2O3-MoO3 and Al-MoO3 systems, Investigated by x-ray powder diffraction, ftir, and dta techniques, Inorganic Materials, 2006, 42(2), pp. 165-170.*

* cited by examiner

*Primary Examiner* — Cynthia Lee
(74) *Attorney, Agent, or Firm* — Kubovcik & Kobovcik

(57) ABSTRACT

Disclosed are an active material for non-aqueous electrolyte secondary battery usable as a power source for backup, which has a large battery capacity and which may prevent the increase in the internal resistance after a storage test; and a non-aqueous electrolyte secondary battery comprising the active material. The active material is used as a positive electrode active material or a negative electrode active material of a non-aqueous electrolyte secondary battery, and this is prepared by adding at least one additive element selected from a group consisting of Al, B, Nb, Ti and W to molybdenum dioxide; and the non-aqueous electrolyte secondary battery comprises the active material.

9 Claims, 1 Drawing Sheet

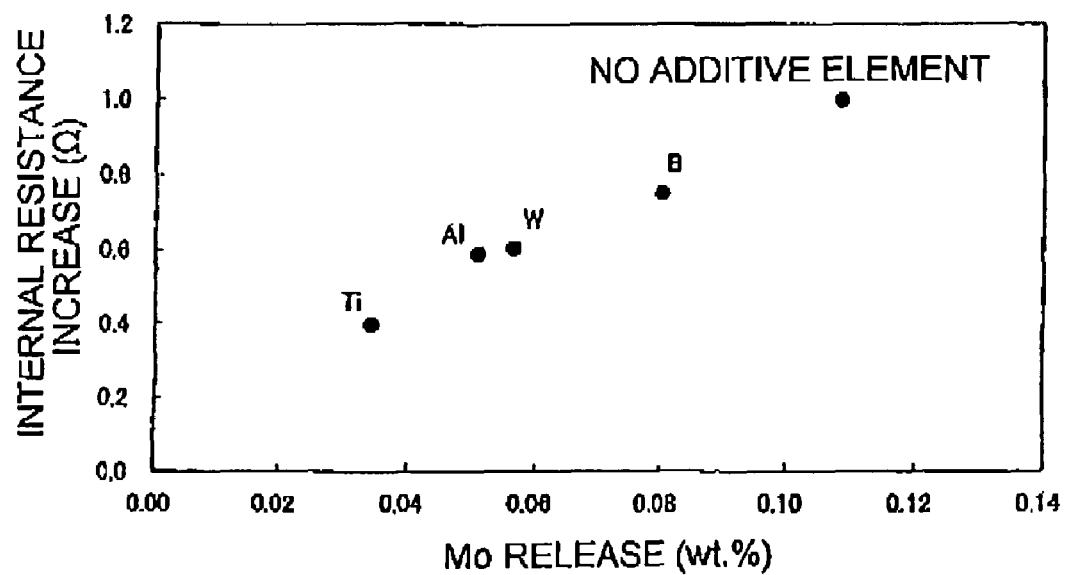

ACTIVE MATERIAL FOR NON-AQUEOUS ELECTROLYTE SECONDARY BATTERY, AND NON-AQUEOUS ELECTROLYTE SECONDARY BATTERY COMPRISING IT

BACKGROUND OF THE INVENTION

1. Field of the Invention

The present invention relates to an active material for non-aqueous electrolyte secondary battery, and to a non-aqueous electrolyte secondary battery comprising it.

2. Description of the Related Art

Recently, secondary batteries comprising a non-aqueous electrolyte solution have become widely utilized as high-power and high-energy density secondary batteries. The non-aqueous electrolyte secondary battery of the type is used as a main power source of mobile appliances and, in addition, it has become used also as a memory backup power source of mobile appliances. With the recent tendency toward increasing the energy density of the main power source of mobile appliances, the power source for memory backup is also desired to have an increased energy density.

As a secondary battery for memory backup, for example, a battery comprising lithium cobaltate ($LiCoO_2$) as the positive electrode active material and spinel-structured lithium titanate ($Li_4Ti_5O_{12}$) as the negative electrode active material has already been put into practical use. As another example, there is mentioned a battery structure in which lithium titanate is used as the positive electrode active material and a lithium-containing carbon material as the negative electrode.

However, the theoretical density and the theoretical weight-related capacity of lithium titanate that is used as the negative electrode active material or the positive electrode active material are 3.47 g/ml and 175 mAh/g, respectively; and this is problematic in that the energy density per volume is low.

Molybdenum dioxide reversibly reacts with lithium in the same potential region as that of lithium titanate, and its theoretical density and theoretical weight-related capacity are 6.44 g/ml and 210 mAh/g, respectively; and as compared with lithium titanate, this has a higher volume-related energy density. Accordingly, using molybdenum dioxide as a substitutive material for lithium titanate may increase the energy density per volume of batteries.

For example, in JP-A 2000-243454, proposed is a battery in which a lithium-containing cobalt oxide or a lithium-containing nickel oxide is used as the positive electrode active material, and molybdenum dioxide is used as the negative electrode active material.

A battery for backup is built in an appliance and mounted thereon as a battery, in which this is utilized with no protective circuit from the viewpoint of the mounting area and the cost. In general, a power from the main power source is supplied to thereto and in that condition, the battery works as fully charged; however, in case where the battery is kept under the condition with no power supply thereto from the main power source for a long time, the battery may be in an over-discharge condition. Accordingly, in any of the charged condition and the over-charged condition, the battery is desired to have excellent storage stability.

As so mentioned in the above, molybdenum dioxide is more excellent in the energy density per volume than lithium titanate. However, the present inventors' studies have revealed that a battery comprising molybdenum dioxide is problematic in that it could not secure sufficient storage stability.

For example, it has been known that a non-aqueous electrolyte secondary battery comprising lithium cobaltate as the positive electrode active material and molybdenum dioxide as the negative electrode active material shows rapid increase in the internal resistance during storage under over-discharge, and is therefore problematic in that it could not have sufficient over-discharge storage stability.

SUMMARY OF THE INVENTION

An object of the invention is to provide an active material for a non-aqueous electrolyte secondary battery usable as a secondary battery for memory backup, which has a large battery capacity and which can prevent the internal resistance from increasing after a storage test; and to provide a non-aqueous electrolyte secondary battery comprising the active material.

The active material of the invention is used as a positive electrode active material or a negative electrode active material for a non-aqueous electrolyte secondary battery, and is characterized by comprising molybdenum dioxide with at least one additive element selected from a group consisting of Al (aluminium), B (boron), Nb (niobium), Ti (titanium) and W (tungsten) added thereto.

The present inventors have found that molybdenum dioxide not having absorbed lithium is extremely unstable in an electrolytic solution, and when it is kept along with an electrolytic solution at a high temperature, then molybdenum dissolves out in the electrolytic solution. Further, the inventors have found that the molybdenum dissolution during high-temperature storage interferes with the reaction in the interface between the electrolytic solution and the active material, thereby increasing the internal resistance of a battery.

In addition, the inventors have further found that the addition of at least one additive element selected from a group consisting of Al, B, Nb, Ti and W may remarkably decrease the molybdenum dissolution into the electrolytic solution during high-temperature storage. These are clarified by the Reference Experiment shown hereinunder.

In the invention, at least one additive element selected from a group consisting of Al, B, Nb, Ti and W is added to molybdenum dioxide. Accordingly, molybdenum is prevented from dissolving out into an electrolytic solution during storage at a high temperature, and after a storage test, the increase in the internal resistance may be prevented.

Preferably, the active material of the invention contains the above additive element in an amount of from 0.1 to 5 mol %. When the content is less than 0.1 mol %, the effect of preventing molybdenum dissolution may be insufficient. When the content is more than 5 mol %, then the absorption amount of lithium as an active material may lower and a high battery capacity could not be obtained. The preferred content range is from 0.2 to 5 mol %.

The method for producing the active material of the invention is not specifically limited. For example, it may be produced according to the following methods. One method comprises uniformly mixing an additive element oxide such as $Al_2O_3$, $B_2O_3$, $Nb_2O_5$, $TiO_2$ and $WO_3$ with a molybdenum oxide such as $MoO_3$, in a predetermined ratio, then reducing the mixture in a reductive atmosphere, for example, in a hydrogen flow thereby giving an additive element-containing molybdenum dioxide of the invention.

Another method comprises dissolving an additive element oxide and a molybdenum oxide such as $MoO_3$ in a predetermined ratio in an aqueous aluminium solution, then evaporating and concentrating it to give an acid ammonium salt, firing it in air to give an oxide mainly comprising $MnO_3$, and thereafter reducing it in a reductive atmosphere such as a hydrogen flow. According to the method, the additive element may be uniformly mixed in molybdenum dioxide.

Regarding its valence, Mo in molybdenum dioxide is preferably IV-valent. In case where a molybdenum oxide having a different valence such as $MoO_{2.25}$ is mixed in the molybdenum dioxide, the initial efficiency may lower or the cycle characteristics may worsen.

The active material according to the another aspect of the invention is characterized in that lithium titanate is mixed in the active material of the invention mentioned in the above, or that is, molybdenum dioxide with at least one additive element selected from a group consisting of Al (aluminium), B (boron), Nb (niobium), Ti (titanium) and W (tungsten) added thereto. The active material prepared by mixing lithium titanate in the molybdenum dioxide of the type is more effective for preventing the increase in the internal resistance after a storage test.

The blend ratio of lithium titanate to the active material of the invention, molybdenum dioxide (additive element-containing molybdenum dioxide:lithium titanate) is preferably within a range of from 95:5 to 25:75 by weight, more preferably from 90:10 to 50:50. When the blend ratio of lithium titanate is too small, then the effect of preventing the increase in the internal resistance after a storage test may be insufficient. When the blend ratio of lithium titanate is too large, then lithium titanate is inferior to molybdenum dioxide in point of the volume energy density, and therefore the volume energy density may lower too much.

Lithium titanate for use in the invention preferably has a spinel structure and has a stoichiometric composition of $Li_4Ti_5O_{12}$ from the viewpoint of the specific capacity and the cycle stability.

The non-aqueous electrolyte secondary battery of the invention comprises the active material of the invention mentioned above, as the positive electrode active material or the negative electrode active material.

The non-aqueous electrolyte secondary battery of the first aspect of the invention is characterized by comprising a negative electrode that contains the above-mentioned active material of the invention as the negative electrode active material, a positive electrode containing a positive electrode active material, and a non-aqueous electrolyte.

As described in the above, in case where the active material of the invention is used as the negative electrode active material, the positive electrode active material is not specifically limited. For it, for example, usable is lithium cobaltate, lithium nickelate, spinel-structured lithium manganate, or a lithium-containing transition metal composite oxide such as lithium-containing cobalt/nickel/manganese composite oxide.

The non-aqueous electrolyte secondary battery of the second aspect of the invention is characterized by comprising a positive electrode that contains the above-mentioned active material of the invention as the positive electrode active material, a negative electrode containing a negative electrode active material, and a non-aqueous electrolyte.

In case where the active material of the invention is used as the positive electrode active material, the negative electrode active material is not specifically limited. For it, for example, usable is a lithium metal, or a compound containing lithium and at least one element selected from a group consisting of Si, C and Al. The compound containing lithium and Li includes an alloy of silicon and lithium. The compound containing lithium and Al includes an alloy of lithium and aluminium. The compound containing lithium and C includes a compound prepared by doping a carbon material such as graphite with lithium.

Using the above-mentioned material as the positive electrode active material may produce a non-aqueous electrolyte secondary battery showing an operating voltage of from 2.0 to 1.0 V or so.

The solvent of the non-aqueous electrolyte for use in the invention includes cyclic carbonates such as ethylene carbonate, propylene carbonate, butylene carbonate; and linear carbonates such as diethyl carbonate, ethylmethyl carbonate, dimethyl carbonate. Preferred is a mixed solvent of a cyclic carbonate and a linear carbonate. The mixed solvent preferably contains ethylene carbonate in an amount of from 5 to 50% by volume. When the ethylene carbonate content is less than 5% by volume, then the non-aqueous electrolyte could not have sufficient lithium ion conductivity. When the ethylene carbonate content is more than 50% by volume, then a film of decomposed ethylene carbonate may be too much formed on the negative electrode active material, thereby worsening the cycle characteristics.

The solute of the non-aqueous electrolyte in the invention includes lithium hexafluorophosphate ($LiPF_6$), lithium borofluoride ($LiBF_4$), LiTFSI ($LiN(CF_3SO_2)_2$), LiBETI ($LiN(C_2F_5SO_2)_2$). The concentration of the elute in the non-aqueous electrolyte is, for example, preferably from 0.5 to 1.5 mol/liter.

The invention provides an active material for non-aqueous electrolyte secondary battery capable of increasing the battery capacity and capable of preventing the increase in the internal resistance after a storage test, and provides a non-aqueous electrolyte secondary battery comprising the active material.

BRIEF DESCRIPTION OF THE DRAWING

The drawing is a graph showing the relation between the amount of Mo released from molybdenum dioxide serving as an active material, and the internal resistance increase in over-discharge storage with the active material as the negative electrode active material.

DESCRIPTION OF THE PREFERRED EMBODIMENTS

The invention is described in more detail with reference to concrete Examples hereinunder; however, the invention should not be whatsoever limited by the following Examples, and may be suitably changed and modified within a range not changing the scope and the spirit thereof.

EXAMPLE A1

[Formation of Positive Electrode]

Lithium cobaltate ($LiCoO_2$) as a positive electrode active material, a carbon material as a conductor, and polyvinylidene fluoride as a binder were kneaded in N-methyl-2-pyrrolidone in a ratio by weight of (lithium cobaltate:carbon material:polyvinylidene fluoride)=92:5:3, thereby giving a positive electrode slurry. The formed slurry was applied onto aluminium foil serving as a collector, then dried and compressed with a rolling roller, and cut to give a coated sample having a size of 2.5 cm×5.0 cm, thereby producing a positive electrode.

[Formation of Negative Electrode Active Material]

$Al_2O_3$ and $MoO_3$ were mixed in an agate mortar so that the Al (aluminium) content could be 1 mol %, and then fired under reduction at 500° C. for 10 hours in a hydrogen reflux flow, thereby giving Al-containing $MoO_2$.

[Formation of Negative Electrode]

The above-mentioned negative electrode active material, a carbon material as a conductor and polyvinylidene fluoride as a binder were kneaded in N-methyl-2-pyrrolidone in a ratio by weight of (negative electrode active material:carbon material:polyvinylidene fluoride)=90:5:5, thereby giving a negative electrode slurry. The formed slurry was applied onto aluminium foil serving as a collector, then dried and compressed with a rolling roller, and cut to give a coated sample having a size of 2.0 cm×4.5 cm, thereby producing a negative electrode.

[Preparation of Electrolytic Solution]

Ethylene carbonate and diethyl carbonate were mixed in a ratio by volume of 3:7 and in the mixed solvent, a solute lithium hexafluorophosphate (LiPF6) was dissolved to have a concentration of 1 mol/liter, thereby preparing a non-aqueous electrolytic solution.

[Formation of Battery]

The above positive electrode and the above negative electrode were coiled in such a manner that their coated surfaces could face each other via a separator of polyethylene therebetween, and then sealed up in a laminate bag along with the electrolytic solution in an inert gas atmosphere, thereby producing a battery A1 of the invention having a rated capacity of 20 mAh.

EXAMPLE A2

In the production of a negative electrode active material, B-containing $MoO_2$ was produced in place of Al-containing $MoO_2$. Concretely, $B_2O_3$ and $MoO_3$ were mixed in an agate mortar so that the B (boron) content could be 1 mol %, and then fired under reduction at 500° C. for 10 hours in a hydrogen reflux flow, thereby giving B-containing $MoO_2$. A battery A2 of the invention was produced in the same manner as in Example A1 but using the active material.

EXAMPLE A3

In the production of a negative electrode active material, Nb-containing $MoO_2$ was produced in place of Al-containing $MoO_2$. Concretely, $Nb_2O_5$ and $MoO_3$ were mixed in an agate mortar so that the Nb (niobium) content could be 1 mol %, and then fired under reduction at 500° C. for 10 hours in a hydrogen reflux flow, thereby giving Nb-containing $MoO_2$. A battery A3 of the invention was produced in the same manner as in Example A1 but using the active material.

EXAMPLE A4

In the production of a negative electrode active material, Ti-containing $MoO_2$ was produced in place of Al-containing $MoO_2$. Concretely, $TiO_2$ and $MoO_3$ were mixed in an agate mortar so that the Ti (titanium) content could be 1 mol %, and then fired under reduction at 500° C. for 10 hours in a hydrogen reflux flow, thereby giving Ti-containing $MoO_2$. A battery A4 of the invention was produced in the same manner as in Example A1 but using the active material.

EXAMPLE A5

In the production of a negative electrode active material, W-containing $MoO_2$ was produced in place of Al-containing $MoO_2$. Concretely, $WO_3$ and $MoO_3$ were mixed in an agate mortar so that the W (tungsten) content could be 1 mol %, and then fired under reduction at 500° C. for 10 hours in a hydrogen reflux flow, thereby giving W-containing $MoO_2$. A battery A5 of the invention was produced in the same manner as in Example A1 but using the active material.

COMPARATIVE EXAMPLE X1

A comparative battery X1 was produced in the same manner as in Example A1, for which, however, $MoO_2$ prepared by reductively firing $MoO_3$ in a hydrogen reflux flow at 500° C. for 10 hours was used as the negative electrode active material.

[Evaluation of Over-Discharge Storage Stability]

The batteries A1 to A5 of the invention and the comparative battery X1 were charged with a charging current of 2 mA up to 3.0 V, and then the constant potential state at 3.0 V thereof was kept as such until the charging current reached 1 mA. Next, these were discharged at a discharging current of 2 mA and 1 mA down to 0.01 V.

The batteries thus over-discharged as in the above were stored at 60° C. for 20 days, and before and after the storage, the internal resistance at 1 kHz of each battery was measured. The internal resistance value after the storage was subtracted from the internal resistance value before the storage to give an internal resistance increase, which is shown in Table 1.

TABLE 1

| | Internal Resistance Increase ($\Omega$) |
|---|---|
| Battery A1 of the Invention | 0.59 |
| Battery A2 of the Invention | 0.75 |
| Battery A3 of the Invention | 0.61 |
| Battery A4 of the Invention | 0.40 |
| Battery A5 of the Invention | 0.60 |
| Comparative Battery X1 | 1.00 |

As is obvious from the results shown in Table 1, the batteries A1 to A5 of the invention each comprising, as the negative electrode active material, molybdenum dioxide with an additive element of Al, B, Nb, Ti or W added thereto have a reduced internal resistance increase, as compared with the comparative battery X1 comprising the additive element-free molybdenum dioxide as the negative electrode active material. From this, it is known that, according to the invention, the internal resistance increase in high-temperature storage under an over-discharge condition can be prevented.

EXAMPLE B1

[Formation of Positive Electrode]

The Al-containing $MoO_2$ produced in Example A1 was used as a positive electrode active material.

The positive electrode active material, a carbon material as a conductor, and polyvinyl fluoride as a binder were kneaded in N-methyl-2-pyrrolidone in a ratio by weight of (positive electrode active material:carbon material:polyvinylidene fluoride)=90:5:5, thereby producing a positive electrode slurry.

The formed slurry was applied onto aluminium foil serving as a collector, then dried and compressed with a rolling roller, and cut to give a coated sample having a size of 2.5 cm×5.0 cm, thereby producing a positive electrode.

[Formation of Negative Electrode]

A lithium metal was cut to give a sample having a size of 4.5 cm×7.5 cm, thereby preparing a negative electrode.

[Preparation of Electrolytic Solution]

A non-aqueous electrolytic solution was prepared in the same manner as in Example A1.

[Formation of Battery]

The above positive electrode and the above negative electrode were coiled in an inert gas atmosphere in such a manner that their coated surfaces could face each other via a separator of polyethylene therebetween, and then sealed up in a laminate bag along with the above electrolytic solution, thereby producing a battery B1 of the invention having a rated capacity of 20 mAh.

EXAMPLE B2

A battery B2 of the invention was produced in the same manner as in Example B1, for which, however, the B-containing $MoO_2$ produced in Example A2 was used as the positive electrode active material.

EXAMPLE B3

A battery B3 of the invention was produced in the same manner as in Example B1, for which, however, the Nb-containing $MoO_2$ produced in Example A3 was used as the positive electrode active material.

EXAMPLE B4

A battery B4 of the invention was produced in the same manner as in Example B1, for which, however, the Ti-containing $MoO_2$ produced in Example A4 was used as the positive electrode active material.

EXAMPLE B5

A battery B5 of the invention was produced in the same manner as in Example B1, for which, however, the W-containing $MoO_2$ produced in Example A5 was used as the positive electrode active material.

COMPARATIVE EXAMPLE Y1

A comparative battery Y1 was produced in the same manner as in Example B1, for which, however, $MoO_2$ used in Comparative Example X1 was used as the positive electrode active material.

[Evaluation of Storage Stability]

Thus produced, the batteries B1 to B5 of the invention and the comparative battery Y1 were stored at 60° C. for 20 days. Before and after the storage, the batteries were compared in point of the internal resistance value thereof at 1 kHz. The internal resistance value after the storage was subtracted from the internal resistance value before the storage to give an internal resistance increase, which is shown in Table 2.

During the storage, the batteries were in a charged state, in which, however, the positive electrode active material molybdenum dioxide does not almost contain lithium and is therefore considered to be in a condition near to that of the over-discharged molybdenum dioxide in the batteries A1 to A5 and the comparative battery X1.

TABLE 2

| | Internal Resistance Increase (Ω) |
|---|---|
| Battery B1 of the Invention | 0.65 |
| Battery B2 of the Invention | 0.44 |
| Battery B3 of the Invention | 0.72 |
| Battery B4 of the Invention | 0.47 |
| Battery B5 of the Invention | 0.20 |
| Comparative Battery Y1 | 1.06 |

As is obvious from the results shown in Table 2, the batteries B1 to B5 of the invention each comprising the positive electrode active material of the invention have a reduced internal resistance increase, as compared with the comparative battery Y1. Accordingly, it is known that, even in the case where the active material of the invention is used as the positive electrode active material, the internal resistance increase in high-temperature storage under a charged condition can be prevented.

EXAMPLE C1

A battery C1 of the invention was produced in the same manner as in Example A1, for which, however, a mixture of the Al-containing $MoO_2$ produced in Example A1 and lithium titanate ($Li_4Ti_5O_{12}$) in a ratio by weight of 75:25 was used as the negative electrode active material.

EXAMPLE C2

A battery C2 of the invention was produced in the same manner as in Example A1, for which, however, a mixture of the Ti-containing $MoO_2$ produced in Example A4 and lithium titanate ($Li_4Ti_5O_{12}$) in a ratio by weight of 75:25 was used as the negative electrode active material.

EXAMPLE C3

A battery C3 of the invention was produced in the same manner as in Example A1, for which, however, a mixture of the W-containing $MoO_2$ produced in Example A5 and lithium titanate ($Li_4Ti_5O_{12}$) in a ratio by weight of 75:25 was used as the negative electrode active material.

COMPARATIVE EXAMPLE Z1

A comparative battery Z1 was produced in the same manner as in Example A1, for which, however, a mixture of $MoO_2$ produced in Comparative Example X1 and lithium titanate ($Li_4Ti_5O_{12}$) in a ratio by weight of 75:25 was used as the negative electrode active material.

[Evaluation of Over-Discharge Storage Stability]

The batteries C1 to C3 of the invention and the comparative battery Z1 were charged with a charging current of 2 mA up to 3.0 V, and then the constant potential state at 3.0 V thereof was kept as such until the charging current reached 1 mA. Next, these were discharged at a discharging current of 2 mA and 1 mA down to 0.01 V.

The batteries thus over-discharged as in the above were stored at 60° C. for 20 days, and before and after the storage, the internal resistance at 1 kHz of each battery was measured. The internal resistance value after the storage was subtracted from the internal resistance value before the storage to give an internal resistance increase, which is shown in Table 3. In addition, the data of the comparative battery X1 are also shown in the Table.

TABLE 3

|  | Internal Resistance Increase (Ω) |
| --- | --- |
| Battery C1 of the Invention | 0.10 |
| Battery C2 of the Invention | 0.08 |
| Battery C3 of the Invention | 0.10 |
| Comparative Battery Z1 | 0.19 |
| Comparative Battery X1 | 1.00 |

As is obvious from the results shown in Table 3, the batteries C1 to C3 of the invention each comprising the active material prepared by mixing an additive element-containing molybdenum dioxide and lithium titanate have a reduced internal resistance increase, as compared with the comparative battery X1. In addition, as compared with the batteries A1, A4 and A5 of the invention shown in Table 1, which comprise, as the active material, an additive element-containing molybdenum dioxide not mixed with lithium titanate, the batteries C1 to C3 of the invention have a further reduced internal resistance increase. From this, it is known that adding lithium titanate to the active material may more effectively prevent the internal resistance increase.

In addition, as compared with the comparative battery Z1 comprising, as the active material, a mixture of additive element-free molybdenum dioxide and lithium titanate, the batteries C1 to C3 of the invention have a reduced internal resistance increase. Accordingly, the effect of adding the additive element to molybdenum dioxide is recognized even in the case mixed with lithium titanate.

<Reference Experiment>

The additive element-containing molybdenum dioxide of the invention produced in the above Examples A1 to A2 and A4 to A5, and the additive element-free molybdenum dioxide produced in Comparative Example X1 were analyzed for the amount of molybdenum release in a non-aqueous electrolytic solution. The same electrolytic solution as in the above Example 1 was used. Concretely, 1.5 g of molybdenum dioxide was dipped in 45 ml of the non-aqueous electrolytic solution at 60° C. for 5 days, and then the amount of molybdenum (Mo) ion in the electrolytic solution was quantitatively determined through ICP spectrometric analysis. The molybdenum (Mo) release relative to the overall amount (1.5 g) of the molybdenum dioxide was as follows:

Al-containing $MnO_2$: 0.05% by weight
B-containing $MnO_2$: 0.08% by weight
Ti-containing $MnO_2$: 0.03% by weight
W-containing $MnO_2$: 0.06% by weight
$MoO_2$: 0.11% by weight The relation between the Mo release from the above-mentioned various active materials and the internal resistance increase in high-temperature storage of the batteries comprising the active material as the negative electrode active material is shown in the drawing.

As shown in the drawing, a correlation was recognized between the Mo release from each active material and the internal resistance increase. Accordingly, it may be considered that reducing the Mo release may be effective for reducing the internal resistance increase.

What is claimed is:

1. An active material for non-aqueous electrolyte secondary battery, which is used as a positive electrode active material or a negative electrode active material of a non-aqueous electrolyte secondary battery, and which is prepared by adding at least one additive element selected from the group consisting of Al, B, Nb and Ti to molybdenum dioxide.

2. The active material for non-aqueous electrolyte secondary battery as claimed in claim 1, which contains the additive element in an amount of from 0.1 to 5 mol %.

3. The active material for non-aqueous electrolyte secondary battery as claimed in claim 1, which is further mixed with lithium titanate.

4. The active material for non-aqueous electrolyte secondary battery as claimed in claim 3, wherein the blend ratio of the active material and lithium titanate (active material/lithium titanate) is from 95:5 to 25:75 by weight.

5. A non-aqueous electrolyte secondary battery comprising a negative electrode that contains the active material of claim 1 as the negative electrode active material, a positive electrode containing a positive electrode active material, and a non-aqueous electrolyte.

6. The non-aqueous electrolyte secondary battery as claimed in claim 5, wherein the positive electrode active material is a lithium-containing transition metal composite oxide.

7. The non-aqueous electrolyte secondary battery as claimed in claim 6, wherein the lithium-containing transition metal composite oxide is lithium cobaltate.

8. A non-aqueous electrolyte secondary battery comprising a positive electrode that contains the active material of claim 1 as the positive electrode active material, a negative electrode containing a negative electrode active material, and a non-aqueous electrolyte.

9. The non-aqueous electrolyte secondary battery as claimed in claim 8, wherein the negative electrode active material is a lithium metal, or a compound containing lithium and at least one element selected from a group consisting of Si, C and Al.

* * * * *